US011913401B1

(12) United States Patent
Liu et al.

(10) Patent No.: US 11,913,401 B1
(45) Date of Patent: Feb. 27, 2024

(54) ENGINE EMISSION CONTROL SYSTEMS FOR DECELERATION FUEL CUTOFF EVENTS AND COLD STARTS

(71) Applicant: GM GLOBAL TECHNOLOGY OPERATIONS LLC, Detroit, MI (US)

(72) Inventors: Chengke Liu, Novi, MI (US); Vijay A Ramappan, Novi, MI (US); Rafat F Hattar, Royal Oak, MI (US); Jeffrey M Kaiser, Highland, MI (US); Joseph Shelton, Fenton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/309,984

(22) Filed: May 1, 2023

(51) Int. Cl.

| | |
|---|---|
| ***F02D 9/04*** | (2006.01) |
| ***F02D 41/04*** | (2006.01) |
| ***F02D 41/12*** | (2006.01) |
| ***F02D 41/06*** | (2006.01) |
| ***F01N 3/20*** | (2006.01) |

(52) U.S. Cl.
CPC ................ *F02D 9/04* (2013.01); *F01N 3/20* (2013.01); *F02D 41/042* (2013.01); *F02D 41/064* (2013.01); *F02D 41/123* (2013.01); *F01N 2430/10* (2013.01); *F02D 2200/0802* (2013.01)

(58) Field of Classification Search
CPC ...... F01N 2430/10; F01N 3/20; F02D 41/064; F02D 41/123
See application file for complete search history.

(56) References Cited

U.S. PATENT DOCUMENTS

2004/0000138 A1* 1/2004 Tamura ................ F02D 9/1055 60/285

* cited by examiner

*Primary Examiner* — Ngoc T Nguyen
(74) *Attorney, Agent, or Firm* — Lorenz & Kopf LLP

(57) ABSTRACT

An engine consumes fuel and air to generate an exhaust gas stream. An exhaust system channels the exhaust gas stream from the engine to a tailpipe. An aftertreatment system is included in the exhaust system and includes a catalyst. An exhaust throttle valve is disposed in the exhaust system downstream from the aftertreatment system. An actuator controls an amount of air pumped through the engine. A controller operates the exhaust throttle valve and/or the actuator to control emissions from the exhaust system during a cold start and following a deceleration fuel cutoff event.

20 Claims, 5 Drawing Sheets

ENGINE EMISSION CONTROL SYSTEMS FOR DECELERATION FUEL CUTOFF EVENTS AND COLD STARTS

INTRODUCTION

The present disclosure relates to engine systems and to the exhaust systems thereof, and more particularly relates to engine systems and exhaust systems that employ an exhaust throttle and/or valve timing control during deceleration fuel cutoff and/or cold starts.

Internal combustion engines convert fuel and air to various compounds while extracting energy to perform intended functions, such as propelling a vehicle. The compounds generated in engines may be further converted or treated by various aftertreatment systems. For example, a two-way catalytic converter converts hydrocarbon (HC) and carbon monoxide (CO) constituents in the exhaust gas stream to innocuous elements or compounds. Also for example, a three-way catalytic converter is designed for converting HC, CO and nitrogen oxides to benign elements or compounds prior to their emission to the atmosphere.

Characteristics of the exhaust leaving an engine is subject to numerous variables and ensuring optimal aftertreatment for optimum conversion is challenging. The challenges are compounded by limitations in the aftertreatment systems such as those that relate to the performance level of catalysts at various temperatures. For example, at cool/cold temperatures, catalysts may have a reduced ability to convert the target compounds. As temperatures increase, the reaction rate of the catalyst in a catalytic converter increases gradually. As a result, when catalyst temperatures are below a temperature where they are effective in initiating reactions, heating is needed. In addition, various engine operating conditions may impact the ability of the catalyst in a catalytic converter to optimally perform.

Accordingly, it is desirable to provide engine systems, and the exhaust systems thereof that have aftertreatment systems, with quick heat up times and with optimized performance capabilities under various operating conditions. Furthermore, other desirable features and characteristics of the present disclosure will become apparent from the subsequent detailed description and the appended claims, taken in conjunction with the accompanying drawings and the foregoing introduction.

SUMMARY

Engine systems and their exhaust systems increase the rate of heating of an exhaust system's catalyst during a cold start, avoid oxygen saturation during deceleration fuel cutoff events and provide rapid response to torque transients following deceleration fuel cutoff events. In a number of embodiments, an engine consumes fuel and air to generate an exhaust gas stream. An exhaust system channels the exhaust gas stream from the engine to a tailpipe. An aftertreatment system is included in the exhaust system and includes a catalyst. An exhaust throttle valve is disposed in the exhaust system downstream from the aftertreatment system. An actuator controls an amount of air going through the engine. A controller operates the exhaust throttle valve and/or the actuator to control emissions from the exhaust system during cold starts and following deceleration fuel cutoff events by reducing the exhaust flow during deceleration fuel cutoff events.

In additional embodiments, the controller determines whether the catalyst is above a threshold temperature. When the catalyst is above the threshold temperature, the controller determines whether a deceleration fuel cutoff is enabled.

In additional embodiments, the exhaust throttle valve includes a throttle plate with an orifice extending through the throttle plate.

In additional embodiments, the exhaust throttle valve includes a throttle plate and a bypass channel with a relief valve providing a pressure relief path around the throttle plate to enable a simple approach to achieve desired exhaust back pressure control during the cold start and the deceleration fuel cutoff events.

In additional embodiments, the controller effects accelerated heating control during the cold start, and effects a choke control to reduce air flow during deceleration fuel cutoff events.

In additional embodiments, the actuator comprises an exhaust valve phaser and the controller controls the exhaust valve phaser and the exhaust throttle valve to reduce air flow entering the aftertreatment system to avoid oxygen saturation of the catalyst while the controller controls an intake throttle to maintain intake manifold pressure above a certain threshold to avoid oil pull over.

In additional embodiments, the controller controls the exhaust throttle valve and the actuator to increase exhaust back pressure and temperature to minimize cold start emissions.

In additional embodiments, the controller controls the actuator and the exhaust throttle valve when exhaust temperatures are below a threshold temperature to minimize cold start emissions.

In additional embodiments, the controller controls the actuator and the exhaust throttle valve during the deceleration fuel cutoff events, and following exit from the deceleration fuel cutoff events during a transition period to ramp up torque.

In additional embodiments, the controller controls air flow through the aftertreatment system during the deceleration fuel cutoff events to minimize oxygen loading of the catalyst.

In a number of other embodiments, an engine emission control system includes an engine that consumes fuel and air to generate an exhaust gas stream. An exhaust system channels the exhaust gas stream from the engine to a tailpipe. An aftertreatment system in the exhaust system includes a catalytic converter containing a catalyst. An exhaust throttle valve is disposed in the exhaust system downstream from the aftertreatment system. The exhaust throttle valve operates to generate a backpressure in the exhaust system during cold starts and deceleration fuel cutoff events. An actuator is operated to control an amount of air going through the engine. The actuator may be an intake throttle, an intake valve phaser, and/or an exhaust valve phaser. A controller operates at least one of the exhaust throttle valve and the actuator to control emissions from the exhaust system during a cold start and after deceleration fuel cutoff events by reducing exhaust flow during the deceleration fuel cutoff events.

In additional embodiments, the controller determines whether the catalyst is above a threshold temperature. When the catalyst is above the threshold temperature, the controller determines whether a deceleration fuel cutoff is enabled, where the deceleration fuel cutoff is operating the engine without fuel as an air pump.

In additional embodiments, the exhaust throttle valve includes a throttle plate that is rotatable between a fully open position and a fully closed position. An orifice extends through the throttle plate to allow a metered amount of flow when the throttle plate is in the fully closed position during cold starts and deceleration fuel cutoff events.

In additional embodiments, the exhaust throttle valve includes a throttle plate and a bypass channel with a relief valve providing a pressure relief path around the throttle plate so that a constant amount of backpressure is maintained in the exhaust system upstream from the exhaust throttle valve.

In additional embodiments, the controller effects accelerated heating control during the cold start by controlling the actuator and the exhaust throttle valve, and effects a choke control to reduce air flow through the engine and the exhaust system during deceleration fuel cutoff events.

In additional embodiments, the actuator is the exhaust valve phaser, and the controller controls the exhaust valve phaser and the exhaust throttle valve to reduce air flow entering the aftertreatment system during the deceleration fuel cutoff events to avoid oxygen saturation of the catalyst.

In additional embodiments, the controller controls the exhaust throttle valve and the actuator to increase exhaust back pressure and temperature in the aftertreatment system to minimize cold start emissions by accelerating heating of the catalyst.

In additional embodiments, the controller controls the actuator and the exhaust throttle valve when exhaust temperatures are below a threshold temperature to minimize cold start emissions. The controller controls the actuator and the exhaust throttle valve when the engine is in the deceleration fuel cutoff events and after the engine exits the deceleration fuel cutoff events with a transition stage control for the exhaust valve phaser and the exhaust throttle valve, and with torque ramping to improve torque response and drive quality.

In additional embodiments, the controller controls the actuator and the exhaust throttle valve during the deceleration fuel cutoff events and following exit from the deceleration fuel cutoff events to minimize oxygen loading of the catalyst during deceleration fuel cutoff events. The controller controls the actuator and the exhaust throttle valve to improve drive quality during a transition period to ramp up torque after exiting from the deceleration fuel cutoff events.

In a number of additional embodiments, a vehicle with an engine emission control system includes an engine that consumes fuel and air to generate an exhaust gas stream. An exhaust system channels the exhaust gas stream from the engine to a tailpipe. An aftertreatment system in the exhaust system includes a catalytic converter containing catalysts. An exhaust throttle valve is disposed in the exhaust system downstream from the aftertreatment system. The exhaust throttle valve operates to generate a backpressure in the exhaust system during cold starts and deceleration fuel cutoff events. An exhaust valve phaser is controlled to set exhaust valve timing to control an amount of air going through the engine. A controller operates the exhaust throttle valve and/or the exhaust valve phaser to control emissions from the exhaust system during a cold start and following deceleration fuel cutoff events.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of steering systems, and that the vehicle system described herein is merely one example embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
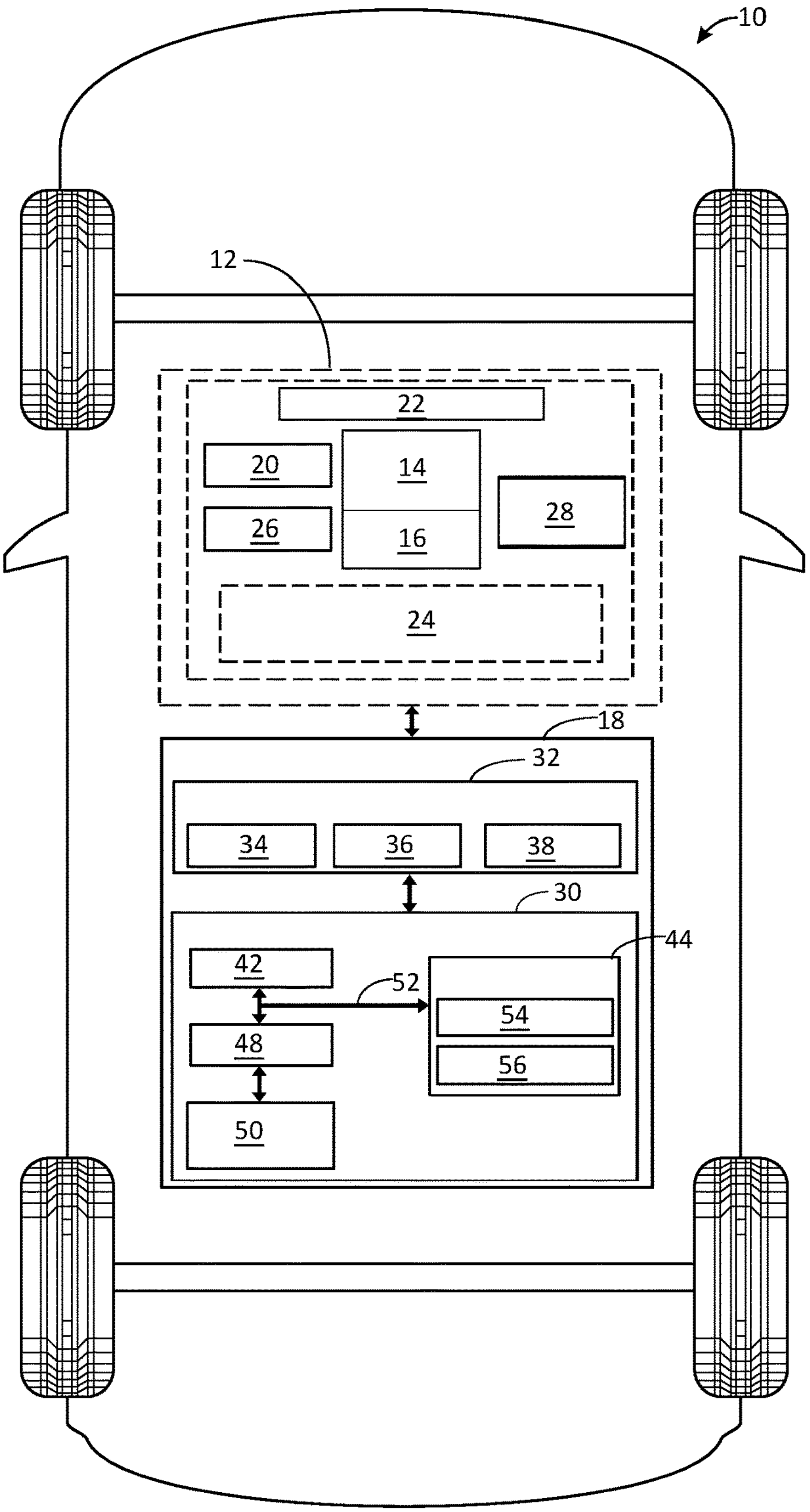
FIG. 1 is a functional diagram of a vehicle that includes an engine with an emission control system for cold starts and deceleration fuel cutoff events, in accordance with an exemplary embodiment.

Referring to FIG. 1, illustrated is a vehicle 10, having a powertrain system 12 according to an exemplary embodiment. In various embodiments, the powertrain system 12 includes an engine 14 operating according to internal combustion principles and controlled to optimize fuel economy and emissions based on the requested load and other factors. The requested load may be based on a driver request or on an autonomous input for torque and/or speed. To deliver the requested torque and/or speed, a transmission 16 is coupled with the engine 14. The transmission 16 may operate to provide forward operation of the vehicle 10, reverse operation of the vehicle 10, and a number of speed ratios for the output from the engine 14 where power may be transferred to the wheels of the vehicle 10. The transmission 16 may also be selectively placed in a park state and in a neutral state where power is not delivered to the wheels of the vehicle 10.

In certain embodiments, the vehicle 10 comprises an automobile. As will be appreciated, the vehicle 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 10 may also comprise a truck, a watercraft, an aircraft, and/or one or more other types of vehicles. In addition, in various embodiments, it will also be appreciated that the vehicle 10 may comprise any number of other types of mobile platforms with an engine system such as the powertrain system 12.

In the depicted embodiment, the vehicle 10 includes a body that substantially encloses other components of the vehicle 10. Also in the depicted embodiment, the vehicle 10 includes a plurality of axles and wheels. The wheels are each rotationally coupled to one or more of the axles near a respective corner of the body to facilitate movement of the vehicle 10. In one embodiment, the vehicle 10 includes four wheels, although this may vary in other embodiments (for example for trucks and certain other vehicles).

The vehicle 10 further includes a control system 18 associated with the powertrain system 12 and with other systems of the vehicle 10. The powertrain system 12 may drive the vehicle wheels to rotate in a forward direction or a reverse direction. The powertrain system 12 generally includes a number of components and subsystems including the engine 14, the transmission 16, an ignition system 20, an intake system 22, an exhaust system 24, a fuel system 26, and a valve system 28. In various embodiments, the powertrain system 12 is a four stroke internal combustion engine in which a piston in each cylinder completes an intake stroke, a compression stroke, a combustion stroke, and an exhaust stroke to drive the engine 14. Any number of cylinders may be included in the engine 14. The intake system 22 delivers air and controls the air's mass flow rate to the cylinders, such as via a throttle. The fuel system 26 delivers fuel to the cylinders and controls its timing and amount via a number of injectors as further described below. The valve system 28 includes a number of valves to control the flow of air/gases into and out of the cylinders, and the valves may have variable timing. The ignition system 20 is operated to control the timing of, and initiate, combustion in the cylinders. The exhaust system 24 conveys combustion gases from the engine 14 to the atmosphere and may include aftertreatment devices.

In various embodiments, the control system 18 provides instructions for controlling various aspects of the vehicle 10 including for controlling the powertrain system 12. In various embodiments, the control system 18 comprises an engine control unit (ECU) for the engine 14. Also in various embodiments, among other functionality, the control system 18 selectively controls operation of the powertrain system 12 to achieve optimized fuel economy and minimized emissions while achieving desired torque and speed outputs. In various embodiments, the control system 18 provides these functions in accordance with the steps of the method 200 described further below in connection with the FIG. 5.

As depicted in FIG. 1, in various embodiments, the control system 18 includes a controller 30 and a sensor array 32. In various embodiments, the sensor array 32 includes sensors for measuring observable conditions, including of the powertrain system 12, and generating sensor data based thereon. As depicted in FIG. 1, in various embodiments, the sensor array 32 includes one or more engine sensors 34. In various embodiments, the engine sensors 34 are attached to, disposed within, or otherwise disposed in proximity to the powertrain system 12 such that various temperatures, positions, speeds, and other observable parameters are measured. The sensor array 32 includes one or more exhaust system sensors 36. In various embodiments, the exhaust system sensors 36 are attached to, disposed within, or otherwise disposed in proximity to the exhaust system 24 such that various temperatures, concentrations, and other observable parameters are measured. In certain embodiments, the sensor array 32 may also include one or more other sensors 38, for example for operation of the engine 14 and/or of other systems and devices of the vehicle 10. For example, in certain embodiments, the other sensors 38 may include one or more sensors for detecting when the engine 14 is turned on and/or running, one or more torque request sensors, such as a throttle position sensor, for detecting load requests of the engine 14, parameters of the transmission 16, and other sensors as desired.

In various embodiments, the controller 30 is coupled with the sensor array 32 and provides instructions for controlling the powertrain system 12 including the engine 14, and the exhaust system 24 via commands based on the sensor data, programs, and stored values. As depicted in FIG. 1, the controller 30 comprises a computer system. In certain embodiments, the controller 30 may also include the sensor array 32 and/or one or more other vehicle components. In addition, it will be appreciated that the controller 30 may differ from the embodiment depicted in FIG. 1. For example, the controller 30 may be coupled with or may otherwise utilize one or more remote computer systems and/or other control systems, for example as part of one or more of the above-identified vehicle devices and systems.

In the depicted embodiment, the computer system of the controller 30 includes a processor 42, a memory 44, an interface 48, a storage device 50, and a bus 52. The processor 42 performs the computation and control functions of the controller 30 and may comprise any type of processor or multiple processors, single integrated circuits such as a microprocessor, or any suitable number of integrated circuit devices and/or circuit boards working in cooperation to accomplish the functions of a processing unit. During operation, the processor 42 executes one or more programs 54 residing, at least temporarily, within the memory 44 and, as such, controls the general operation of the controller 30 and the computer system of the controller 30, generally in executing the processes described herein, such as the processes of the method 200 as further described below in connection with FIG. 5.

The memory 44 may be any type of suitable memory. For example, the memory 44 may include various types of dynamic random access memory (DRAM) such as SDRAM, the various types of static RAM (SRAM), and the various types of non-volatile memory (PROM, EPROM, and flash). In certain examples, the memory 44 may be located on and/or co-located on the same computer chip as the processor 42. In the depicted embodiment, the memory 44 stores the above-referenced programs 54 along with stored values 56 (e.g., including, in various embodiments, predetermined threshold values for controlling emissions).

The bus 52 serves to transmit the programs 54, data/values 56, status and other information or signals between the various components of the computer system of the controller 30. The interface 48 allows communications with the computer system of the controller 30, such as from a system driver and/or another computer system and is implemented using any suitable method and apparatus. In one embodiment, the interface 48 obtains the various data from the sensor array 32, the powertrain system 12, the exhaust system 24, and/or one or more other components and/or systems of the vehicle 10. The interface 48 may include one or more network interfaces to communicate with other systems or components. The interface 48 may also include one or more network interfaces to communicate with one or more storage interfaces to connect to storage apparatuses, such as the storage device 50.

The storage device 50 may be any suitable type of storage apparatus, including various different types of direct access storage and/or other memory devices. In one exemplary embodiment, the storage device 50 comprises a program product from which the memory 44 receives the programs 54 that execute one or more embodiments of one or more processes of the present disclosure, such as the steps of the method 200 discussed further below in connection with FIG. 5. In another exemplary embodiment, the program product may be directly stored in and/or otherwise accessed by the memory 44 and/or the storage device 50 and/or other memory devices.

The bus 52 may be any suitable physical or logical means of connecting computer systems and components. This includes, but is not limited to, direct hard-wired connections, fiber optics, infrared, and wireless bus technologies. During operation, the programs 54 are stored in the memory 44 and are executed by the processor 42.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 42) to perform and execute the programs. Such a program product may take a variety of forms, and the present disclosure applies equally regardless of the particular type of computer-readable signal bearing media used to carry out the distribution. Examples of signal bearing media include recordable media such as disks, hard drives, memory cards, optical devices, and transmission media such as digital and analog communication links. It will be appreciated that cloud-based storage and/or other techniques may also be utilized in certain embodiments. It will similarly be appreciated that the computer system of the controller 30 may also otherwise differ from the embodiment depicted in FIG. 1, for example in that the computer system of the controller 30 may utilize any number of controllers, may be coupled to, or may otherwise utilize, one or more remote computer systems and/or other control systems.

Figure 2:
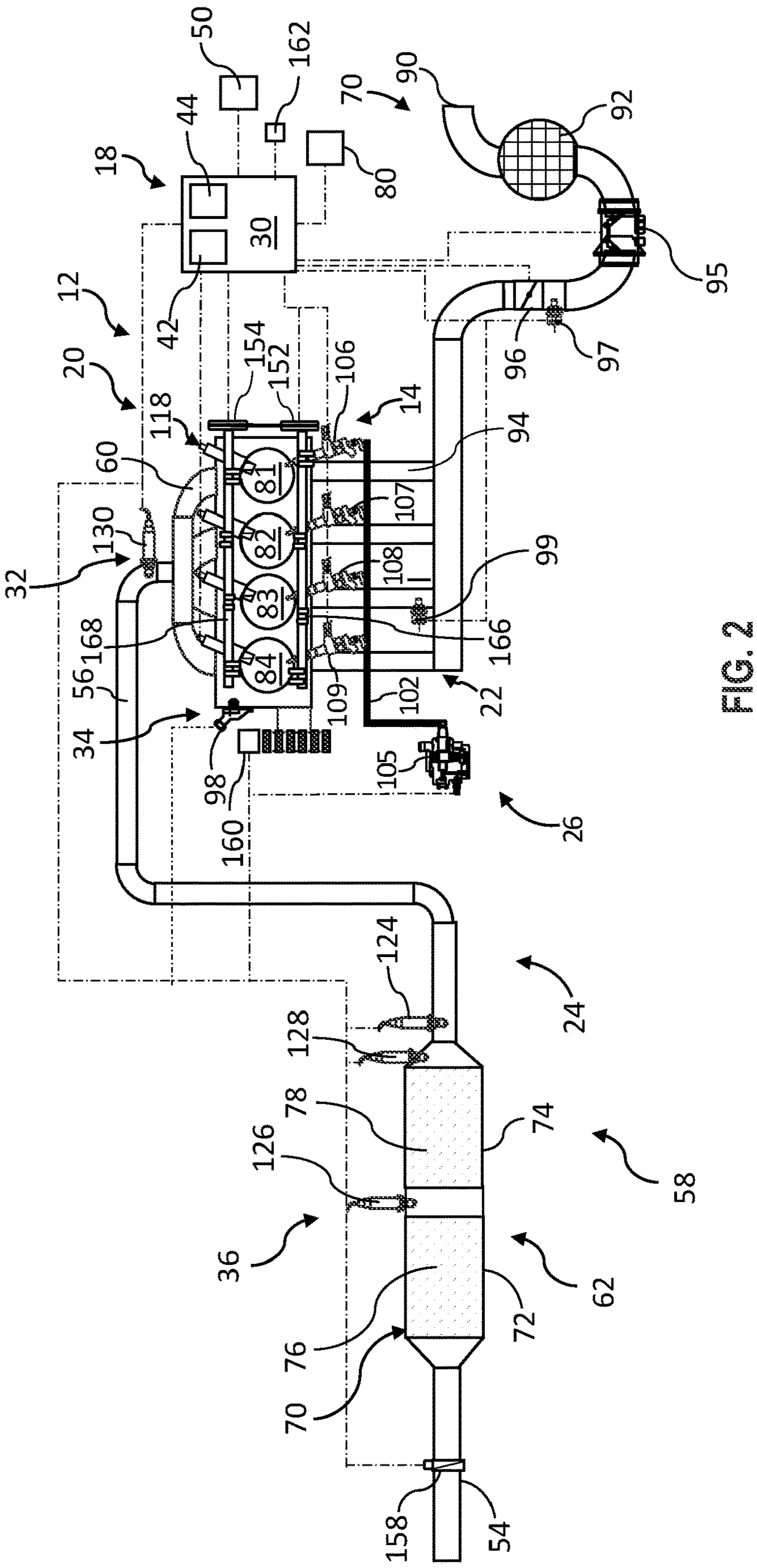
FIG. 2 is a schematic illustration of the engine and emission control system of the vehicle of FIG. 1 with an exhaust throttle valve and various actuators, in accordance with various embodiments.

Referring to FIG. 2, the powertrain system 12 includes the engine 14, which in the present embodiment is a four cylinder gasoline and air consuming internal combustion engine. In other embodiments, the engine 14 may have a different number of cylinders. The powertrain system 12 includes an emission control system 58 that, for example, optimizes effectiveness of the exhaust system 24 during coasting and/or cold starts as further described below. The engine 14 may be naturally aspirated as illustrated, or in other embodiments may include a turbocharger or supercharger to pump/charge air into the engine 14. The current disclosure is applicable whether the engine 14 is naturally aspirated or includes charging. It will be appreciated that a turbocharger or supercharger, when included, pressurizes the intake air of the engine 14 enabling the engine to pump a higher mass of air. As such, it will be apparent that in cases such as coasting or startup, intake charging may generally not be needed/activated. In some embodiments, during operation of the emission control system 58 during coasting and/or startup, charging, when included, may be deactivated.

The powertrain system 12 includes, or is associated with, the exhaust system 24 for conveying exhaust gases from the combustion chambers of the engine 14 to a tailpipe 55 for discharge to the atmosphere. A pipe section 57 runs from the engine 14, such as from its exhaust manifold 60 to an aftertreatment system 62 including an aftertreatment device 70, which in this embodiment includes a two element arrangement with catalytic converters 72 and 74. In other embodiments, a different number of catalytic converters/elements may be included, and they may be located at different locations in the exhaust system 24. The catalytic converters 72, 74 may be of the two-way type or the three-way type. The catalytic converters 72, 74, when configured as a two-way type, convert two components in the exhaust gas stream, such as CO and HC, to other constituents. When the catalytic converters 72, 74 are configured as a three-way type, they convert three components in the gas stream to other elements or compounds, such as by converting CO, HC and nitrogen oxides to innocuous elements or compounds. In the current embodiment, the catalytic converters 72, 74 are the three-way type. The catalytic converters 72, 74 may contain catalysts 76, 78 such as platinum, palladium, rhodium, or other materials. The rates at which the catalysts 76, 78 assist in the conversion of exhaust gases may vary relative to temperature, for example at cold/cool temperatures the conversion rates may decline significantly.

The powertrain system 12 is spark ignition operated and as such, includes the ignition system 20 with individual spark plugs 118 in each of the cylinders 81-84. The ignition system 20 also includes an ignition sensor 80, such as may be operated by a key, an interface, or a remote transmitter. The ignition sensor 80 may be coupled with the controller 30 to initiate operation of the vehicle 10.

The powertrain system 12 includes the intake system 22 with an air inlet 90, an air filter 92 and an intake manifold 94. The intake manifold 94 supplies air to the cylinders 81-84 of the engine 14 as controlled by intake valves (not illustrated). The exhaust system 24 conveys, as controlled by exhaust valves (not illustrated), combusted gases from the cylinders 81-84 to atmosphere through the exhaust system 24 and the tailpipe 55. Disposed in the intake system 22 downstream from the air filter 92 and upstream from the intake manifold 94 are, in order, a mass air flow sensor 95, an intake pressure sensor 97 and an intake throttle 96. The engine 14 is liquid cooled and includes a coolant temperature sensor 98 to provide data on the operating temperature of the engine 14. As used herein, upstream and downstream mean the relative location of something in the flow of air/gases through the powertrain system 12 from the air inlet 90 to the tailpipe 55. For example, the air inlet 90 is upstream from the air filter 92 and the catalytic converter 74 is downstream from the exhaust manifold 60.

The powertrain system 12 includes the fuel system 26 for supplying fuel to the cylinders 81-84. In the current embodiment, the engine 14 is a gasoline-direct-injection engine 14 with a fuel rail 102 supplying fuel from a fuel pump 105 to injectors 106-109. In other embodiments, the engine 14 may have another type of fuel system, such as port injection or central injection. The powertrain system 12 also includes the control system 18 that generally includes the controller 30 coupled with the various actuators and sensors.

The controller 30 may receive various signals from the sensor array 32 and may send control signals to various actuators for operation of the powertrain system 12 and its related systems. In the current embodiment, the sensor array 32 includes the exhaust system sensors 36, which may include oxygen sensors 124 and 126, an exhaust gas temperature sensor 128, such as upstream from the aftertreatment device 70, and an exhaust gas pressure sensor 130. The position of the exhaust gas temperature sensor 128 is selected to measure the temperature of the exhaust gas entering the catalytic converter 40. In other embodiments, the exhaust gas temperature sensor 128 may be located downstream from the aftertreatment device 70, or at another location in the exhaust system 24. In further embodiments, two exhaust gas temperature sensors 128 may be included, with one upstream from the aftertreatment device 70 and the other downstream from the aftertreatment device 70. The exhaust gas pressure sensor 130 may be located at various positions upstream from the aftertreatment device 70 to monitor pressure. The oxygen sensors 124, 126 measure the oxygen content of the exhaust gases leaving the engine 14/before the aftertreatment device 70 and after the catalytic converter 74/before the catalytic converter 72. The oxygen sensors 124, 126 provide data to determine the amount of remaining CO in the gas stream at their locations in the exhaust system 24. The oxygen sensors 124, 126 may be exhaust/oxygen/wide range air-fuel (WRAF) sensors. The signals from the oxygen sensors 124, 126 vary according to changing oxygen levels in the exhaust and enable determining unburned oxygen in the exhaust indicative of CO content. The signals from the oxygen sensors 124, 126 may also be used to determine the fuel/air ratio and other parameters at which the engine 14 is operated by the controller 30.

The sensor array 32 includes the engine sensors 34, which include engine system monitors such as the mass air flow sensor 95, the intake pressure sensor 97, the coolant temperature sensor 98, a manifold absolute pressure sensor 99, and an engine speed sensor 160. The mass air flow sensor 95 provides the controller 30 with signals indicative of mass air flow rate through the air filter 92 and into the engine 14. The mass air flow sensor 95 may be a multi-function device that also provides signals indicate of humidity, barometric pressure, and induction air temperature. The intake pressure sensor 97 provides the controller 30 with signals indicative of absolute air pressure downstream of the air filter 92. The manifold absolute pressure sensor 99 provides the controller 30 with signals indicative of pressure in the intake manifold 94, which may be used to compute the air mass flow rate into the engine 14. When embodied with natural aspiration of the engine 14, only one of the mass air flow sensor 95 or the manifold absolute pressure sensor 99 may be included. When embodied with charging of the engine 14, both the mass air flow sensor 95 and the manifold absolute pressure sensor 99 may be included. The engine speed sensor 160 may sense crank position, providing input on the changing positions from which speed of the engine 14, and particularly the angular speed of the crankshaft, may be determined. In some embodiments, the engine speed sensor 160 may be configured to deliver a rotational speed signal for the speed of the engine 14 such as in revolutions-per-minute.

The other sensors 38 may include any number of sensors of the vehicle 10 and include the ignition sensor 80 for sensing an engine on request/state. In embodiments, the ignition sensor 80 may be an ignition switch or another type of device for detecting the engine on request/state. The other sensors 38 include a pedal position sensor 162 to monitor torque requests, such as by driver inputs. In autonomous vehicle applications, instead of determining torque requests based on signals from the pedal position sensor 162, the controller 30 may generate the torque requests.

In the current embodiment, the actuators may include a number of devices associated with controlling operation of the powertrain system 12 and/or the vehicle 10. These actuators may include the intake throttle 96, the fuel injectors 106-109, the spark plugs 118, and the fuel pump 105. The actuators may also include an intake valve phaser 152 and an exhaust valve phaser 154 for variable valve timing. The intake valve phaser 152 adjusts the position (phase) of the intake camshaft 166 relative to the crankshaft of the engine 14 and the exhaust valve phaser 154 provides the same function for the exhaust camshaft 168. The intake valve phaser 152 and the exhaust valve phaser 154 may be embodied in various forms that function to delay or advance valve timing. The actuators may include any number of additional devices such as an exhaust throttle 158 (described in greater detail below), and others.

In the depicted embodiment, the controller 30 includes the processor 42 and the memory 44 and is coupled with the storage device 50. The controller 30 commands an amount of fuel to be delivered to each cylinder 81-84 through the fuel system 26. A fuel-to-air ratio is the mass of fuel being delivered to the engine 14 over the mass of air being delivered to the engine 14. during normal operation of the engine 14, the amount of fuel commanded, generally correlates to the amount needed for stoichiometric operating conditions given the current operating state of the engine 14. Stoichiometric operation supplies the precise amount of air needed to result in complete burning of the fuel delivered to the cylinders 81-84 for converting all of the delivered fuel to carbon dioxide and water. Accordingly, a ratio of fuel-to-air that provides the right amount of air to completely burn the delivered fuel, is referred to as stoichiometric.

The powertrain system 12, the control system 18, the intake system 22 and the exhaust system 24 effect processing of multiple working fluids to accomplish desired results. For example, intake air and fuel are processed through the engine 14 with an air/fuel ratio delivered to the cylinders in closed-loop control, using inputs from the various sensors including those in the exhaust system 24 to make corrections for efficient operation and air/fuel consumption. In addition, the exhaust gas from the engine 14 is efficiently processed through the exhaust system 24 with control to accelerate heat up from a cold start to quickly reach effective reaction rates in the aftertreatment device 70 and to minimize emission effects from various control events of the engine 14.

In embodiments, the controller 30 may initiate operation of the engine 14 with deceleration fuel cutoff (DFCO). For DFCO operation, the injectors 106-109 of the engine 14 may be shut off during coast-down of the vehicle 10, with the engine 14 operating as an air pump without fuel consumption. During these DFCO events, the engine 14 pumps the air through the exhaust system 24 without consumed fuel constituents. For example, when the driver of the vehicle 10 lifts their foot off the accelerator, such as sensed by the pedal position sensor 162, and based on other conditions, the controller 30 may initiate a DFCO event.

DFCO may be implemented based on various parameters such as torque requests, as indicated by the pedal position sensor 162, speed of the engine 14 as indicated by the engine speed sensor 160, speed of the vehicle 10, and others. When DFCO is enabled, the controller 30 may turn off the injectors 106-109 stopping the flow of fuel to the cylinders 81-84 of the engine 14. As a result, the engine 14 spins without firing and operates as an air pump. Pumping air into the high temperature aftertreatment device 70, results in cooling the catalyst 76, 78 and also exposes the catalyst 76, 78 to significant levels of oxygen in the air. Use of DFCO saves fuel as the vehicle 10 is coasting and when no fuel is being consumed, reduced emissions result. A side effect is that pumping cool air through the aftertreatment system 62 cools the catalyst 76, 78. As noted above, the functioning of the catalyst 76, 78 is temperature dependent. In addition, when the catalyst 76, 78 is exposed to umped air, oxygen may saturate the catalyst 76, 78, which approaches/reaches its limit of absorbing oxygen decreasing the ability to convert NOx. For the normal operation this saturation possibility is less because stored oxygen is consumed when the engine 14 is consuming fuel to initiate reactions to convert the CO and HC constituents that are then present. However, when in a DFCO event, these reactions do not take place, so when NOx conversion is needed, such as at exit from DFCO, a saturated catalyst 76, 78 is less effective. Accordingly, as described below, control is effected to avoid oxygen saturation of the catalyst 76, 78.

Figure 3:
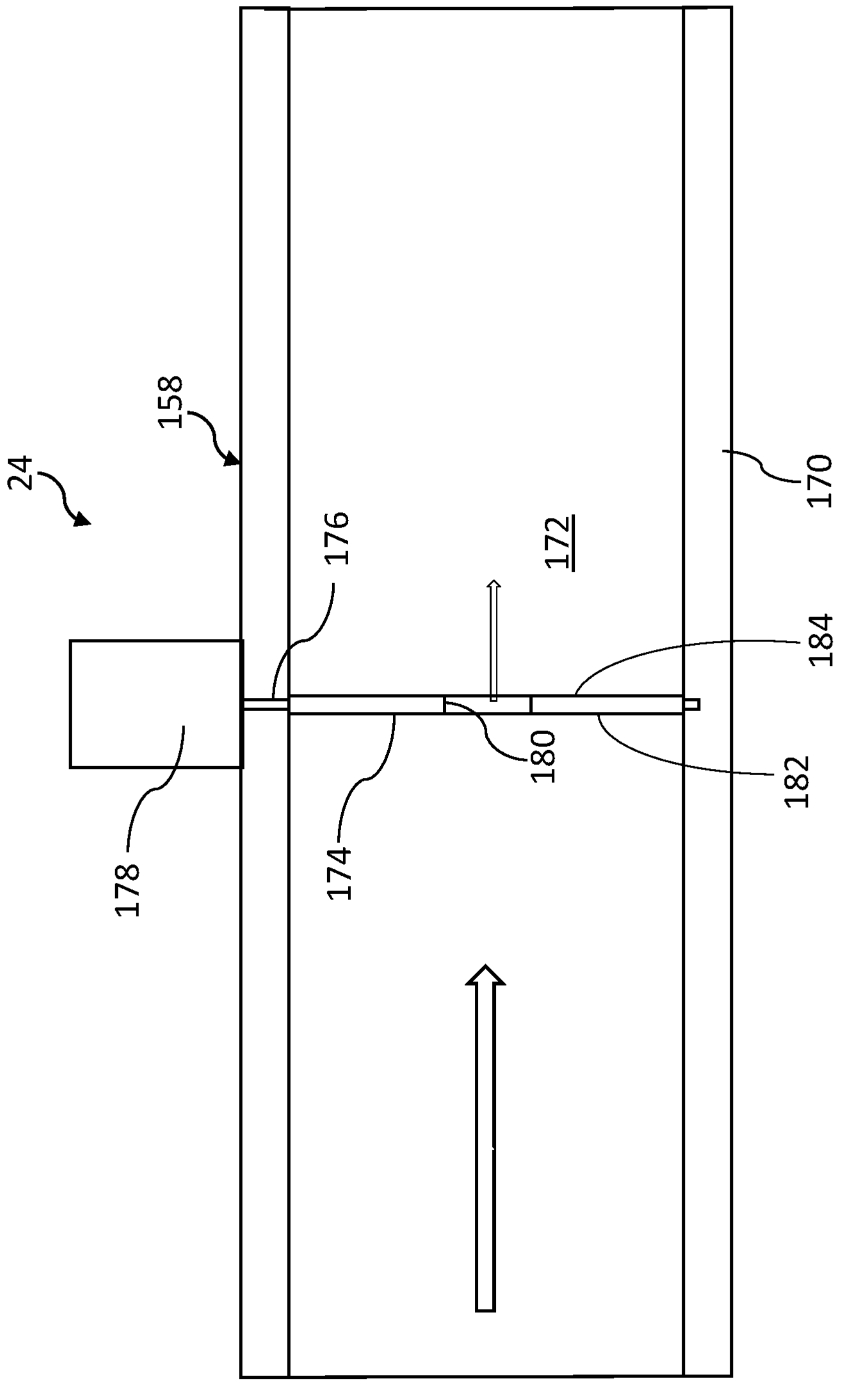
FIG. 3 is a schematic illustration of the exhaust throttle valve area of the systems of FIG. 2, in accordance with various embodiments.

The area of the exhaust system 24 at the exhaust throttle valve 158 is shown schematically in FIG. 3, to which reference is directed. In general, the exhaust throttle valve 158 is operable in response to the controller 30 to create/adjust back pressure upstream from it in the exhaust system 24 and as a result to control the amount of flow through, and the pressure in the aftertreatment device 70. As illustrated in FIG. 3, the exhaust throttle valve 158 includes a throttle body 170 defining a flow channel 172 as a part of the exhaust system 24. A throttle plate 174 is disposed in the throttle body 170 and extends completely across the flow channel 172. As such, the throttle plate 174 may be circular in shape to fit closely within the throttle body 170 with sufficient clearance to rotate. The throttle plate 174 is carried on a shaft 176, which is rotatable by an actuator 178 and which is constructed to rotate the shaft 176 and the throttle plate 174 in response to the controller 30. The actuator 178 may be electric, electromechanical or otherwise configured such as with a motor or other device to rotate the throttle plate 174 through at least ninety degrees between a fully open position where the throttle plate 174 is positioned to admit maximum flow through the flow channel 172 and a fully closed position where the throttle plate 174 blocks flow through the flow channel 172. The actuator 178 may move the throttle plate 174 to any position between the fully open position and the fully closed position to selectively throttle flow through the throttle body 170 to various extents.

An orifice 180 is formed in the throttle plate 174 to admit some exhaust gas flow through the exhaust throttle valve 158 from the upstream side 182 to the downstream side 184 even when the throttle plate 174 is fully closed. The orifice 180 is designed to effect a selected amount of back pressure on the upstream side 182 during DFCO and cold starts. The operating conditions of the engine 14 in those conditions are evaluated to ensure air/exhaust gas may pass through the orifice 180 to enable startup and DFCO operation while create sufficient backpressure to support operation without generating excessive backpressure that would inhibit the desired operation.

The exhaust throttle valve 158 may be used to throttle flow through the exhaust system 24 to various extents, including in combination with other control actions, for a variety of objectives. For example, throttling flow may be used to increase exhaust gas temperature in the catalytic converters 72, 74. Also for example, throttling flow reduces flow through the catalytic converters 72, 74, which may be used to reduce oxygen loading of the catalyst 76, 78.

Figure 4:
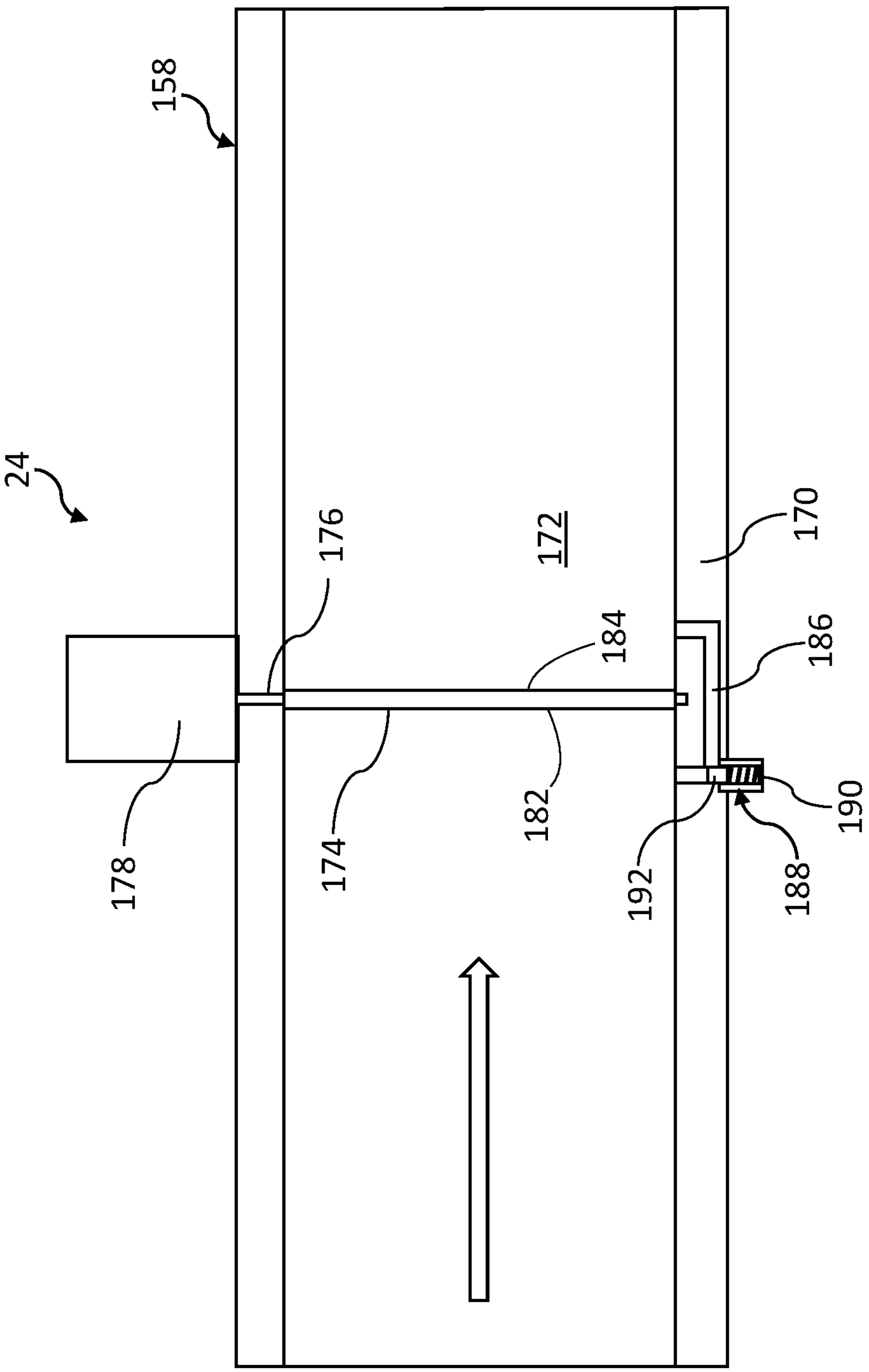
FIG. 4 is a schematic illustration of the exhaust throttle valve area of the systems of FIG. 2 with an alternative embodiment of the exhaust throttle valve, in accordance with various additional embodiments.

Referring to FIG. 4, an alternate embodiment of the exhaust throttle valve 158 is illustrated. In this embodiment, rather than having an opening in the throttle plate 174 (orifice 180 in FIG. 3), the throttle plate 174 effects a complete closure of the flow channel 172 when completely closed. A bypass channel 186 is provided through the throttle body 170. The bypass channel 186 provides a flow path around the throttle plate 174 from the upstream side 182 to the downstream side 184. A pressure relief valve 188 is disposed in the bypass channel 186. For example, a spring 190 backed valve body 192 moves in response to increased pressure on the upstream side 182 to allow flow through the bypass channel 186 at a calibrated pressure. Inclusion of the pressure relief valve 188 enables maintaining the desired backpressure in the exhaust system 24, including in the aftertreatment device 70 when the throttle plate 174 is closed. This embodiment of the exhaust throttle valve 158 may be used when the orifice embodiment of FIG. 3 is not amenable to meeting the flow requirements of the engine 14 and the exhaust system 24.

Figure 5:
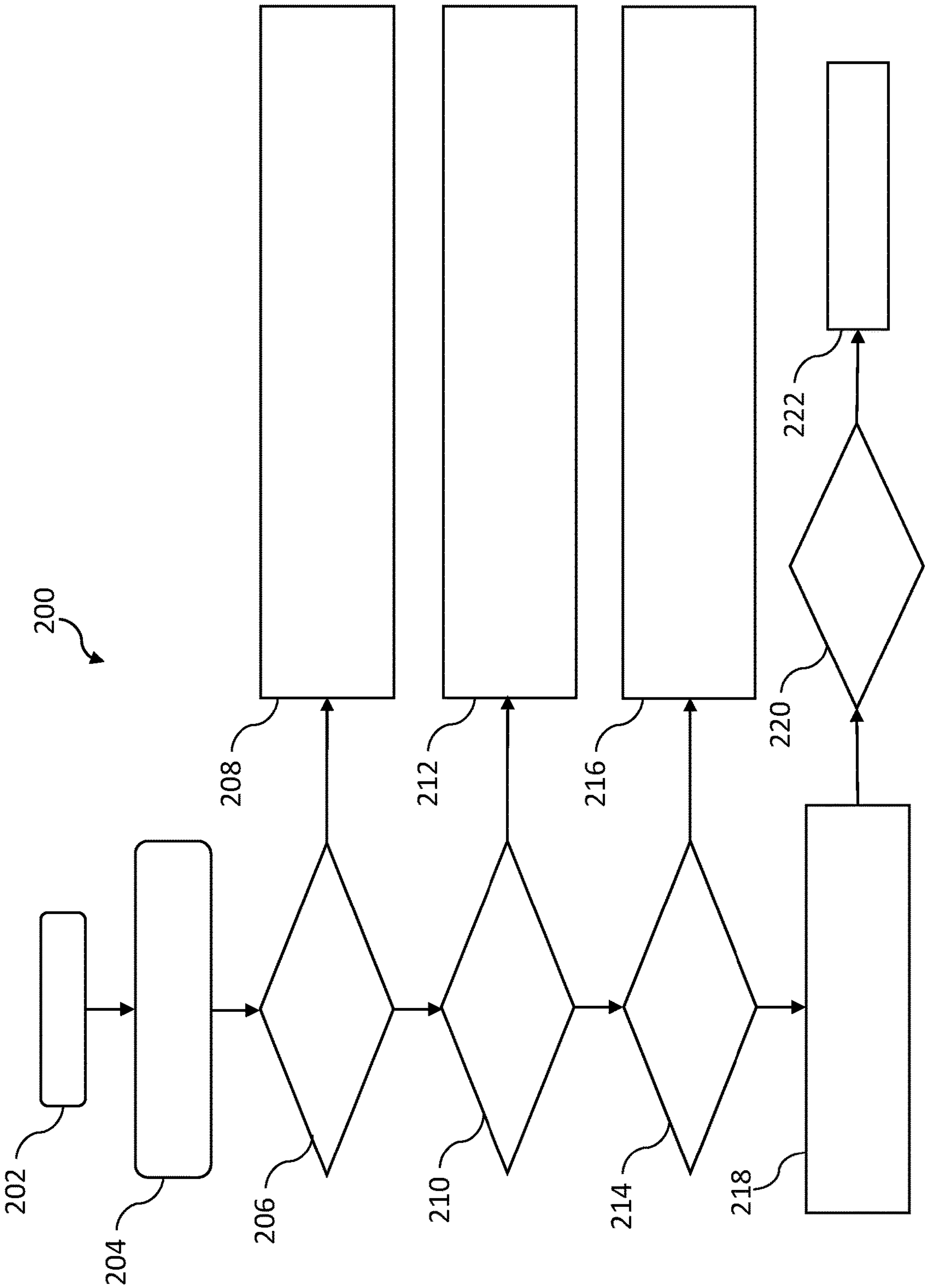
FIG. 5 is a method flowchart of a process for implementing the systems of FIGS. 1-4, in accordance with various embodiments.

Referring to FIG. 5 along with FIGS. 1-4, a method 200 for control of the engine 14 and the emission control system 58 is depicted. As will be appreciated in light of the disclosure, the order of operation within the method 200 is not limited to the sequential execution as illustrated in FIG. 5 but may be performed in one or more varying orders as applicable and in accordance with the present disclosure.

The method 200 starts 202 and may be scheduled to run based on one or more predetermined events. In the current embodiment, the method 200 starts 202 and continues to run whenever the vehicle 10 is in operation. For example, upon initiation of operation of the vehicle 10 by an ignition switch, remote fob, by a driver door open, or other device represented generally by the ignition sensor 80, the controller 30 awakens and the method 200 starts 202. The controller 30 obtains 204 various parameters and obtains 204 the programs 54 and the values 56 as needed. The obtaining 204 step may include reading signals from any of the engine sensors 34, the exhaust system sensors 36 and the other sensors 38.

The method 200 includes a determination 206, by the controller 30, as to whether a catalyst threshold temperature is exceeded. For example, the processor 42 may reference a threshold temperature value from the stored values 56 in the memory 44. The threshold temperature is based on the nature of the catalyst in the aftertreatment device 70 and its characteristic light-off temperature. In examples, the threshold temperature may be in the range of 250-350 degrees Celsius, but may be different based on the catalyst 76, 78. The threshold temperature value may be compared to a sensed temperature or simulated exhaust temperature, such as received from the exhaust gas temperature sensor 128 or a simulation mode. For example, a modelled temperature value may be determined using values from multiple other sensors of the engine 14. In any case, when the sensed temperature is not higher than its respective threshold temperature, the determination 206 is negative and the method 200 proceeds to accelerated heating control 208 of the catalyst 76, 78.

The accelerated heating control 208 may include control of the exhaust throttle valve 158 and/or control of at least one actuator to increase the temperature of the exhaust gas exiting the engine 14 and flowing through the catalytic converters 72, 74. For example, exhaust valve opening during the exhaust stroke may be advanced, which results in reduces exhaust stroke expansion and increases exhaust gas temperatures. In some embodiments, delaying intake valve opening and advancing exhaust valve opening results in faster catalyst light-off.

In an embodiment, for the accelerated heating control 208, the exhaust throttle valve 158 is closed to increase backpressure and increase temperature in the catalytic converters 72, 74 and the exhaust phaser is operated to advance the exhaust valve timing to increase exhaust temperatures. The controller 30, by the processor 42 moves the throttle plate 174 to the fully closed position by operation of the actuator 178 and moves the timing of the exhaust camshaft 168 to advance by the exhaust valve phaser 154. Advancing the exhaust valve phasing and closing the exhaust throttle valve 158 increases exhaust back pressure and temperature resulting in an increased torque command/engine load during idling, resulting in improved catalyst warmup.

Following operation of the selected actuator 178 of the exhaust throttle valve 158 and the selected actuator, such as the exhaust valve phaser 154, for the accelerated heating control 208, the method 200 returns to obtain 204 new information such as from the sensor array 32 and again determines 206 whether the threshold exhaust temperature is exceeded. When the determination 206 is again negative, the method 200 again effects the accelerated heating control 208 in a dynamic control loop. The extent to which the operation is controlled to increase exhaust gas temperature may vary depending on the operating state of the engine 14, and in particular based on engine speed, such as obtained from the engine speed sensor 160, air flow, such as may be obtained from the mass air flow sensor 95 and/or the intake pressure sensor 97 or simulation values, and exhaust pressure, such as may be obtained from the exhaust gas pressure sensor 130 or simulation values. For example, at different speed of the engine 14, different cam positions may be effected. The control positions of the cams via the exhaust valve phaser 154, for example, may be obtained by the controller from memory, such as via a lookup table, which may be developed by characteristic testing and/or by computer-based modelling using commercially available software.

When the determination 206 is positive, meaning the sensed temperature is higher than the threshold temperature, light-off is achieved and the method 200 proceeds to determine 210 whether DFCO is enabled. For example, the controller 30, such as via the processor 42 may evaluate the signal from the pedal position sensor to determine 210 whether the driver is not requesting torque and the vehicle 10 is coasting. The controller 30 may also determine whether the speed of the vehicle 10 is above a threshold speed and whether the speed of the engine 14 is within a range amenable to DFCO.

When the determination is positive and DFCO is enabled, the method 200 proceeds to choked control 212 to accomplish objectives such as to delay oxygen saturation of the catalyst 76, 78 by reducing the air flow into the exhaust system and flowing out from the catalytic converters. For example, the choked control 212 may have the objective of reducing the volumetric efficiency of the engine 14. Reducing volumetric efficiency means the engine 14 does not pump as much air/gas as it is capable of pumping so that the amount of air/gas delivered through the exhaust system 24 is reduced. In general, various actuators may be used to reduce air flow. For example, the intake throttle 96 may be moved in a closing direction to throttle flow. In another example, the timing of the intake valves may be delayed by operating the intake valve phaser 152, which reduces the amount of air that is contained in the cylinders 81-84. In an additional example, the timing of the exhaust valves may be delayed by operating the exhaust valve phaser 154 drawing less air into the cylinders 81-84. In addition, it is ensured that the intake manifold pressures are above a threshold value to avoid oil pullover by the controller controlling the intake throttle 96 to maintain intake manifold pressure above a certain threshold. Also, the drive quality effects of this control are considered after exiting the DFCO. Therefore, optimized intake throttle positions, intake phaser and exhaust phaser positions for different engine speed conditions are used to achieve lower exhaust flow without compromising the drive quality after exiting the DFCO, which can be obtained from either simulation or experiments. Using exhaust throttle to reduce the exhaust flow during DFCO is another choice, which has less effects on the drive quality after exiting the DFCO.

Reducing the amount of air pumped through the catalytic converters 72, 74 by the engine 14 reduces the amount of oxygen to which the catalysts 76, 78 are exposed and reduces cooling of the catalyst 76, 78. Because only air is pumped through the exhaust system 24 by the engine 14 during a DFCO event, the choked control 212 has an objective of supporting effective operation of the catalyst 76, 78 following exit from DFCO and supporting a smooth response to torque transient requests, such as from the driver, following the DFCO event. The post DFCO response time is improved by operation of the exhaust throttle valve 158 in addition to the other selected actuator control. In an example, the choked control 212 includes operating the exhaust valve phaser 154 and/or the exhaust throttle valve 158 to reduce air flow entering the catalytic converters 72, 74 to delay oxygen saturation of the catalyst 76, 78 during the DFCO event and to avoid cooling the catalyst 76, 78 to a level below its light-off temperature. Otherwise, the effect of saturating the catalyst 76, 78 with oxygen would be that when the DFCO event is exited, the effectiveness in converting NOx would be diminished. Also, maintaining the catalyst 76, 78 at a higher temperature increases its effectiveness when the DFCO event is exited.

It has been found as part of the current disclosure that controlling both the intake valve phaser 152 and the exhaust valve phaser 154 to delay or advance at the same time leads to drive quality reductions such as torque lag when the driver tips in and requests torque due to increased response time when both phasers are in need of adjustment. For example, returning both phasers to their normal operating positions simultaneously may create a draw on the hydraulic pressure available to effect their movement slowing their response. In addition, slow responses for intake events tend to be less forgiving than for exhaust events. Accordingly, in embodiments, only one of the intake valve phaser 152 or the exhaust valve phaser 154 is delayed/advanced for the choked control 212, which in the current embodiment is the exhaust valve phaser 154.

Following operation of the actuator 178 of the exhaust throttle valve 158 and/or the selected actuator, such as the exhaust valve phaser 154, in the choked control 212, the method 200 returns to obtain 204 new information such as from the sensor array 32 and again determines 206 whether the threshold exhaust temperature is exceeded. Assuming the determination 206 is positive, and the determination 210 is positive meaning DFCO is enabled, the method 200 again effects the choked control 212 in a dynamic control loop. The extent to which the volumetric efficiency of the engine 14 is reduced may vary depending on the operating state of the engine 14, and in particular based on engine speed, such as obtained from the engine speed sensor 160, air flow, such as may be obtained from the mass air flow sensor 95 and/or the intake pressure sensor 97 and exhaust pressure, such as may be obtained from the exhaust gas pressure sensor 130.

When the determination 210 is negative, meaning DFCO is not enabled, the method 200 proceeds to determine 214 whether the DFCO enablement was recently exited. For example, if the determination 214 is positive meaning that DFCO was exited within the preceding one second, the method 200 proceeds to transition control 216. The transition control 216 has an objective of improving drive quality of the vehicle 10 by providing a fast response time to transient torque requests. In other words, lag due to actuator response time and resulting operation of the engine 14 is minimized. The transient torque request, such as based on inputs signals from the pedal position sensor 162 or in autonomous mode from the controller 30 itself, provides a target torque. The controller 30, effects torque ramping based on the operating state of the engine 14, and in particular based on engine speed, such as obtained from the engine speed sensor 160, air flow, such as may be obtained from the mass air flow sensor 95 and/or the intake pressure sensor 97, spark timing, such as may be obtained from control of the ignition system 20, and exhaust pressure, such as may be obtained from the exhaust gas pressure sensor 130. During the transition control 216, the exhaust throttle valve 158 and the selected actuator such as the exhaust valve phaser 154 are modulated to ramp up torque supplied by the engine 14 to achieve the target torque during the time period (e.g., a one second DFCO exit window), following DFCO exit to optimize drive quality. In addition, a balance is weighed for providing fast response by limiting the air flow through the catalyst 76, 78 during the DFCO event to minimize the effects of the cam response time to transient torque requests after the DFCO event.

The controller 30 may continue to monitor the relative parameters and ramp up torque during the DFCO exit window. When the time of the DFCO exit window has elapsed and the determination 214 is negative, the method 200 proceeds to normal operation 218 of the engine 14 and the exhaust system 24. Normal operation 218 means the exhaust throttle valve 158 is moved to the full-open position and the actuators are controlled based on their calibrated schedules.

The method 200 proceeds to a determination 220 as to whether the engine 14 is running. When the engine 14 is running, the determination 220 is positive and the method 200 proceeds to the obtain 204 step and proceeds therefrom. When the determination 220 is negative, meaning the engine 14 is turned off, the method 200 ends 222.

Accordingly, engine systems reduce tailpipe gaseous (hydrocarbon and/or carbon monoxide) emissions and/or oxides of nitrogen emissions during cold start and exiting DFCO operating conditions. Exhaust temperature is increased at startup to heat the catalysts more rapidly, such as by advancing exhaust phaser control and/or closing the exhaust throttle valve. Including an orifice or a pressure relief in the exhaust throttle valve enables effective control of backpressures when the exhaust throttle valve is closed. In addition, excessive catalyst cooling and oxygen saturation effects are avoided during DFCO events, with improved drive quality during DFCO exit. Controlling the exhaust phaser only instead of both the intake phaser and the exhaust phaser improves drive quality with smoother torque ramp up following DFCO exit, while achieving a comparable level of emissions control. The drive quality improvements are furthered by combining exhaust throttle valve control with exhaust phaser control.

During DFCO, dynamically controlling the exhaust valve phaser and/or the exhaust throttle valve to reduce air flow entering the catalytic converter(s) delays catalyst oxygen saturation, which reduces or eliminates actions to purge the oxygen saturate optimizing converter efficiency and resulting in minimized emissions after exiting DFCO.

During cold starts, dynamically controlling the exhaust throttle valve and/or advancing the exhaust valve phasing increases exhaust back pressure and temperature resulting in an increased torque command/engine load during idling, resulting in improved catalyst warmup to achieve catalyst oxidization-reduction reaction earlier, which reduces total cold start emissions.

Combining exhaust valve phasing and exhaust throttle valve control during cold start and DFCO reduces emissions with minimal impact vehicle drive quality.

Adding a pressure release valve or a well-designed orifice in the exhaust throttle valve's plate further controls exhaust flow resulting in higher exhaust temperatures during cold start and reduced oxygen saturation during DFCO events. Including a pressure release valve simplifies the control strategy in achieving the desired exhaust back pressure threshold.

Cold start emission improvements are achieved by triggering the exhaust phaser and/or exhaust throttle valve control when exhaust temperatures are below thresholds for optimal catalyst conversion efficiency and the control is then exited when the target exhaust temperatures or duration are achieved.

Improved emissions after exiting the DFCO are achieved by reducing the amount of air flow during DFCO utilizing the exhaust valve phasing control and/or exhaust throttle valve control to delay oxygen saturation of the catalyst. Transition state control of exhaust valve phaser, exhaust throttle valve, and torque ramping within certain period (e.g., 1 sec) after exiting the DFCO improves torque response and drive quality.

Exhaust valve phaser control and/or exhaust throttle valve control improves both cold start emissions and tailpipe emissions after exiting DFCO events.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An engine emission control system, comprising:

an engine configured to consume fuel and air to generate an exhaust gas stream;

an exhaust system configured to channel the exhaust gas stream from the engine to a tailpipe;

an aftertreatment system in the exhaust system, the aftertreatment system including a catalyst;

an exhaust throttle valve disposed in the exhaust system;

an actuator configured to control an amount of air going through the engine; and a controller configured to operate at least one of the exhaust throttle valve and the actuator to control emissions from the exhaust system during a cold start and after deceleration fuel cutoff events by reducing exhaust flow during the deceleration fuel cutoff events.

2. The engine emission control system of claim 1, wherein the controller configured to:

determine whether the catalyst is above a threshold temperature; and when the catalyst is above the threshold temperature, determine whether a deceleration fuel cutoff is enabled.

3. The engine emission control system of claim 1, wherein the exhaust throttle valve includes a throttle plate, with an orifice extending through the throttle plate.

4. The engine emission control system of claim 1, wherein the exhaust throttle valve includes a throttle plate and a bypass channel with a relief valve providing a pressure relief path around the throttle plate to enable an approach to achieve desired exhaust back pressure control during the cold start and the deceleration fuel cutoff events.

5. The engine emission control system of claim 1, wherein the controller is configured to:

effect accelerated heating control during the cold start; and effect a choke control to reduce air flow during a deceleration fuel cutoff event.

6. The engine emission control system of claim 1, wherein the actuator comprises an exhaust valve phaser and the controller is configured to control the exhaust valve phaser and the exhaust throttle valve to reduce air flow entering the aftertreatment system to avoid oxygen saturation of the catalyst while the controller controls an intake throttle to maintain intake manifold pressure above a certain threshold to avoid oil pull over.

7. The engine emission control system of claim 1, wherein the controller is configured to control the exhaust throttle valve and the actuator to increase exhaust back pressure and temperature to minimize cold start emissions.

8. The engine emission control system of claim 1, wherein the controller is configured to control the actuator and the exhaust throttle valve when exhaust temperatures are below a threshold temperature to minimize cold start emissions.

9. The engine emission control system of claim 1, wherein the controller is configured to control the actuator and the exhaust throttle valve during the deceleration fuel cutoff event and following exit from the deceleration fuel cutoff event during a transition period to ramp up torque.

10. The engine emission control system of claim 1, wherein the controller is configured to control air flow through the aftertreatment system during the deceleration fuel cutoff event to minimize oxygen loading of the catalyst.

11. An engine emission control system, comprising:

an engine configured to consume fuel and air to generate an exhaust gas stream;

an exhaust system configured to channel the exhaust gas stream from the engine to a tailpipe;

an aftertreatment system in the exhaust system, the aftertreatment system including a catalytic converter containing a catalyst;

an exhaust throttle valve disposed in the exhaust system, the exhaust throttle valve configured to generate a backpressure in the exhaust system during cold start and deceleration fuel cutoff events;

an actuator configured to control an amount of air going through the engine, the actuator comprising at least one of an intake throttle, an intake valve phaser, and an exhaust valve phaser; and a controller configured to operate at least one of the exhaust throttle valve and the actuator to control emissions from the exhaust system during a cold start and after the deceleration fuel cutoff events by reducing exhaust flow during the deceleration fuel cutoff events.

12. The engine emission control system of claim 11, wherein the controller configured to:

determine whether the catalyst is above a threshold temperature; and when the catalyst is above the threshold temperature, determine whether a deceleration fuel cutoff is enabled, where the deceleration fuel cutoff comprises operating the engine without fuel as an air pump.

13. The engine emission control system of claim 11, wherein the exhaust throttle valve includes a throttle plate that is rotatable between a fully open position and a fully closed position, with an orifice extending through the throttle plate to allow a metered amount of flow when the throttle plate is in the fully closed position during the cold start and the deceleration fuel cutoff events.

14. The engine emission control system of claim 11, wherein the exhaust throttle valve includes a throttle plate and a bypass channel with a relief valve providing a pressure relief path around the throttle plate so that a constant amount of backpressure is maintained in the exhaust system upstream from the exhaust throttle valve.

15. The engine emission control system of claim 11, wherein the controller is configured to:

effect accelerated heating control during the cold start by controlling the actuator and the exhaust throttle valve; and effect a choke control to reduce air flow through the engine and the exhaust system during the deceleration fuel cutoff events.

16. The engine emission control system of claim 11, wherein the actuator comprises the exhaust valve phaser and the controller is configured to control the exhaust valve phaser and the exhaust throttle valve to reduce air flow entering the aftertreatment system during the deceleration fuel cutoff event to avoid oxygen saturation of the catalyst.

17. The engine emission control system of claim 11, wherein the controller is configured to control the exhaust throttle valve and the actuator to increase exhaust back pressure and temperature in the aftertreatment system to minimize cold start emissions by accelerating heating of the catalyst.

18. The engine emission control system of claim 11, wherein the controller is configured to control the actuator and the exhaust throttle valve when exhaust temperatures are below a threshold temperature to minimize cold start emissions and to control the actuator and the exhaust throttle valve when the engine is in the deceleration fuel cutoff events, and after the engine exits the deceleration fuel cutoff events, with a transition stage control for the exhaust valve phaser and the exhaust throttle valve, and with torque ramping to improve torque response and drive quality.

19. The engine emission control system of claim 11, wherein the controller is configured to control the actuator and the exhaust throttle valve during the deceleration fuel cutoff event and following exit from the deceleration fuel cutoff event to minimize oxygen loading of the catalyst during the deceleration fuel cutoff events and improve drive quality during a transition period to ramp up torque after exiting from the deceleration fuel cutoff events.

20. A vehicle with an engine emission control system, comprising:

an engine configured to consume fuel and air to generate an exhaust gas stream;

an exhaust system configured to channel the exhaust gas stream from the engine to a tailpipe;

an aftertreatment system in the exhaust system, the aftertreatment system including a catalytic converter containing catalysts;

an exhaust throttle valve disposed in the exhaust system downstream from the aftertreatment system, the exhaust throttle valve configured to generate a back-pressure in the exhaust system during cold start deceleration fuel cutoff events;

an exhaust valve phaser configured to set exhaust valve timing to control an amount of air going through the engine; and a controller configured to operate at least one of the exhaust throttle valve and the exhaust valve phaser to control emissions from the exhaust system during the cold starts and following the deceleration fuel cutoff events.

* * * * *